INVENTORS
LEONARD J. HAIMOVITZ
ROY C. ADAMS
BY [signature]

INVENTORS
LEONARD J. HAIMOVITZ
ROY C. ADAMS
BY

INVENTORS.
LEONARD J. HAIMOVITZ
ROY C. ADAMS
BY
[signature]

INVENTORS
LEONARD J. HAIMOVITZ
ROY C. ADAMS
BY [signature]

INVENTORS.
LEONARD J. HAIMOVITZ
ROY C. ADAMS
BY
[signature]

1

3,439,725

DRAW-CURTAIN MECHANISM

Leonard J. Haimovitz, Englewood Cliffs, N.J., and Roy C. Adams, Jackson Heights, N.Y., assignors to Lensol Promotional Sales Inc., New York, N.Y.

Filed Dec. 20, 1966, Ser. No. 603,347
Int. Cl. A47h *5/14, 13/00*
U.S. Cl. 160—84 5 Claims

ABSTRACT OF THE DISCLOSURE

An improved draw-curtain employing a generally rectangular body of fabric secured to a hollow support member and including a plurality of control lines alternately interleaved along vertical paths throughout the length of the fabric, said lines being collected through bushings in the support member within its hollow chamber and being received at one end of the support member by a draw-string to permit the fabric to be raised and lowered. In addition, a rod member is secured at the bottom of the fabric to maintain the shape and tension of the curtain. In addition, a weighted pull-cord serves as a counterbalance for the curtain so that the curtain remains in a stable position after adjustments in height.

This invention relates to an improved type of window curtain.

More specifically, this invention relates to a new and improved draw-curtain mechanism having a hollow-support means for concealing the lifting cords of the curtain.

In conventional draw-type curtains it is customary to employ a generally rectangular fabric body dependent upon a horizontal support member such as a curtain rod or the like. The height of the fabric body is controlled by cords extending through a hem of the fabric body and secured to the bottom end thereof. The cords are usually collected at the top of the curtain along its horizontal support member by means of a plurality of eyelets, hooks and fasteners. The collected cords of the curtain are then brought out on one or both sides of the curtain and extended downward along its length to a drawstring. By pulling downward on the drawstring, the cords are pulled through fasteners, loops, hooks, latches, and eyelets and through the hem of the fabric body to raise the curtain. The eyelets, hooks, latches and fabric through which the cords are pulled induce a considerable amount of frictional drag on the cords, so as to not only increase the force required to raise and lower the curtain, but also to cause wear on the cords and fabric surrounding the eyelets. Moreover, in draw-curtains it is customary to employ a latch to frictionally grip the drawstring to maintain the curtain at a set height, against the force of its own weight tending to open it to its full length.

In most conventional draw-type curtains, the cords employed to control height are generally exposed and travel externally along the surface of its uppermost horizontal support member so that dust, plaster and other foreign materials may easily become there entangled and thus significantly shorten the life span of the curtain.

According to the present invention an improved draw-type curtain is provided wherein all of the control cords running along the vertically-spaced tapes are collected within the hollow chamber of the uppermost horizontal support member. The cords pass from the fabric body into the support member through low-friction bushings and extend along the internal portion of the support member to be collected at one end. The collected cords are brought out at one end of the support member through an additional low-friction bushing and are connected to a drawstring.

2

The draw-curtain, according to the invention, also employs a weighted cross-member along its bottom, joined to the end of the fabric body for maintaining the fabric in tension. Moreover, the weight of the bottom member may constitute a significant portion of the weight of the curtain's fabric body so that it is possible to employ at the end of the drawstring a counterweight to offset the weight of the bottom support member and the average amount of material gathered thereon. This eliminates the need for using a latch to grip the drawstring to hold the curtain at a predetermined height. With these and the above-described advantages of the curtain mechanism in mind, it is thus possible to employ transparent "monofilament" type of lines instead of bulky, unsightly cords to control the height of the fabric body.

It is therefore an object according to the present invention to provide a draw-curtain mechanism for containing and protecting its control cords.

It is still another object according to the present invention to provide a draw-curtain mechanism which is counterbalanced to maintain itself in a stable position for any predetermined height.

It is still a further object according to the present invention to provide a draw-curtain mechanism having an improved design which enables the use of significantly smaller, lighter-weight cords for controlling its height.

It is a further object according to the present invention to provide a draw-curtain mechanism which can be adjusted to fit windows of different heights.

It is still another object according to the invention to provide a draw-curtain which is simple in construction, which can be manufactured from existing curtain materials, and which can be sold at a reasonable cost.

Other objects and features of the present invention will become apparent from the following detailed description considered in connection with the accompanying drawings, which disclose the embodiments of the present invention. It should be understood, however, that the drawings are designed for the purposes of illustration only, and not as a definition of the limits of the invention as to which reference should be made to the appended claims.

In the drawings wherein similar reference characters denote similar elements throughout the several views.

Figure 1:
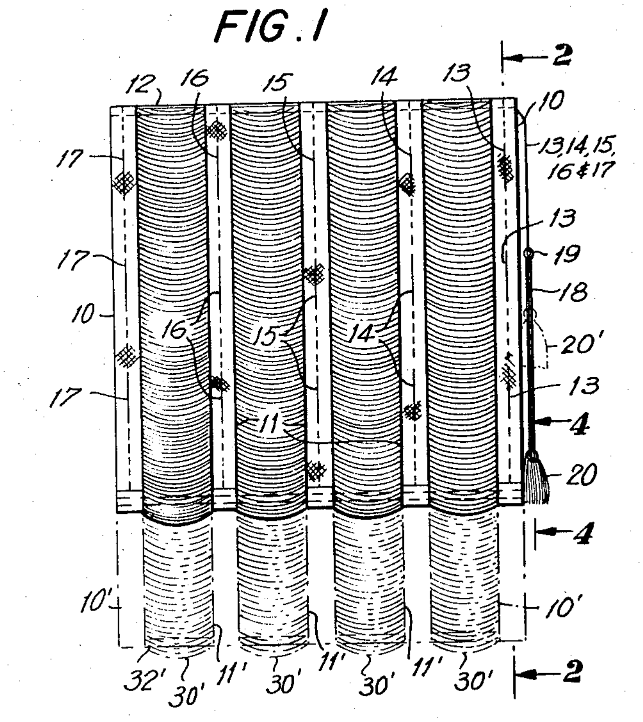
FIG. 1 is a front elevational view of one embodiment of the curtain, according to the invention.
Figure 2:
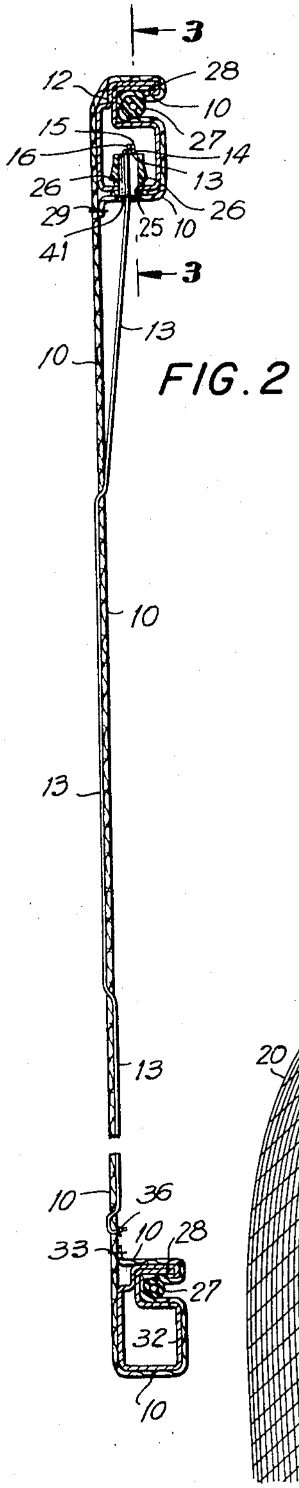
FIG. 2 is a view taken along section 2—2 of FIG. 1.
Figures 3, 4:
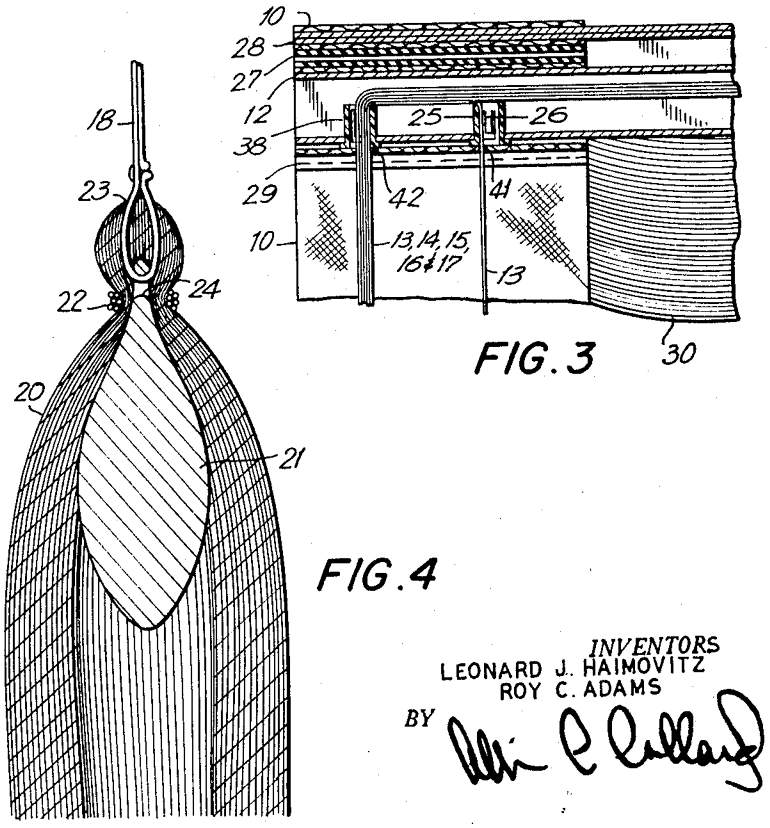
FIG. 3 is a view along section 3—3 of FIG. 2.
FIG. 4 is an enlarged view of the counterweight secured at the end of the drawstring of the curtain mechanism in FIG. 1, according to the invention.

Referring to FIGS. 1–4, there is shown one embodiment of the improved draw-curtain mechanism according to the invention having an uppermost hollow support member 12 for supporting a fabric body. For the purposes of illustration only, the fabric body consists of an "Austrian" type of curtain. It is possible to employ any type of fabric body for use with the curtain mechanism. The Austrian curtain consists of a pair of vertically-spaced fabric tapes 10 at each end, and identical vertically-spaced intermediate fabric tapes 11 between end tapes 10. Secured to the bottom of the tapes is a weighted member 32 which maintains the fabric in tension to retain its decorative shape for any height of the curtain. The curtain is shown fully extended in the dotted line portion of FIG. 1, wherein prime numbers denote similar elements.

Horizontal support member 12 consists of a hollow rod, preferably constructed from an aluminum extrusion as commonly employed in the manufacture of screens, storm windows and the like. Beneath each of tapes 10 and 11, in support 12, is a ferrule 25 which has been inserted into a hole drilled into the bottom of member 12 along the center line of each of tapes 10 and 11. Ferrule 25 is commonly used in the assembly of electrical hardware and is constructed of a low-friction plastic material for bearing the cords which control the height of the curtain. Ferrule 25 contains a pair of elastic self-locking tabs 26, formed by a pair of U-shaped slots within the cylindrical body of the ferrule and which expand outwardly after insertion into the bottom hole of member 12 to prevent its removal therefrom.

Formed in the upper rim of member 12 is a U-shaped groove 28. In the construction of the curtain, tapes 10 and 11 are loosely wrapped around support member 12 and hemmed by stitch line 29. A resilient tube or strip 27, having a diameter approximately the same as the width of groove 28, is then pressed into the groove over tapes 10 and 11 so as to draw the fabric in tension around support member 12. The portion of fabric 10 in communication with ferrule 25 is lanced to provide an aperture 41 to permit a filament 13 to extend downward along the length of the tape toward its bottom. Approximately every six inches along the length of tape 10, filament 13 alternately pierces the tape and extends the same distance along its opposite side.

At the bottom end of tape 10 a weighted rod 32 is secured within the hem of the tape formed by stitch line 33. Rod 32, which may be identical in construction to support 12, also contains a U-shaped groove to permit the insertion of elastic strip 27 over tape 10 to pretension the fabric in a manner similar to that described with respect to support member 12. Filament 13 is shown terminated on the surface of tape 10 immediately above rod 32 by making a short loop ending formed by knot 36. In a like maner, filaments 14, 15, 16 and 17 are strung alternately through tapes 10 and 11, and terminated at their bottom adjacent to rod 32. Filaments 13–17 pass through their respective ferrules 25 into the internal hollow portion of support member 12 and are collected at one end of support 12 through end ferrule 38. The collected filaments are brought through aperture 42 formed within tape 10 adjacent to the opening of ferrule 38, and terminate at ring 19. Drawstring 18, made from a decorative fabric cord, is connected at one end to ring 19 and extended along the sides of the curtain over a convenient length before terminating in tassel 20. A loop 23 is formed at the end of string 18 and passes through eyelet 24 of a counterweight 21, hidden beneath tassel 20. A band 22 secures tassel 20 tightly against counterweight 21.

Each of the lines or filaments 13–17 may be constructed from a transparent high-tension "monofilament" synthetic fiber, such as nylon or dacron, commonly used for fish line. Filaments 13–17 have an inherently smooth surface so as to enjoy a low coefficient of sliding friction with respect to their contact with tapes 10 and 11, and ferrules 25 and 38.

When the drawstring 18 is pulled downward, filaments 13–17 are collected by ferrules 25 within the hollow portion of support member 12 and fed through ferrule 38. Since filaments 13–17 are not pinned to tapes 10 and 11, but are only in slidable contact, they are drawn through their respective alternating paths in the tapes so that the tapes and fabric 30, secured intermediate thereto, are collected in accordion-like pleats against rod 32 as the curtain ascends. Since fabric 30 is gathered only at the bottom of the curtain as it is raised, the density of the fabric above support 32 remains unchanged until it it collected thereagainst.

It is obvious that as the curtain rises and the material is gathered against rod 32, the tension in each of filaments 13–17 increases proportionately. If the fabric, body of the curtain comprised of tapes 10 and 11, and fabric 30, is of a light-weight texture, and rod 32 is made a significant portion of the weight thereof, it is possible to balance the curtain mechanism in a stable position for any desired height by offsetting the weight of rod 32 and the average weight of the material gathered thereagainst by an appropriate counterweight 21 having a predetermined mass. It is obvious that if there was no friction in the movement of the filaments to control the height of the curtain, such a scheme of counterbalance would be impossible. However, in the construction of the curtain according to the invention whereby each of the filaments alternately pass through the extending tapes, an inherent frictional drag is created which serves as a bias to offset the effect of the weight of the gathered material against rod 32. Thus for curtains of reasonably long lengths, a fixed counterweight will serve to balance the height of the curtain at any predetermined setting without the need for latching or clamping the drawstring as is commonly done with conventional curtains.

The bottom rod member also serves to maintain vertical tapes 10 and 11 equally-spaced apart for any setting of the height of the curtain, and thus overcomes the tendency of this type of curtain to converge inwardly at its center as it is extended to its full length.

Referring to FIGS. 5–8, there is disclosed another embodiment of the draw-urtain according to the invention which employs a hollow hemispherical-shaped uppermost support member for supporting the weight of the draw-curtain. Secured to each end of support member 50 is a decorative end cap 51 having a "teardrop" shape, in common usage for many types of draperies. Support member 50 is commonly employed as a curtain rod for use in sliding curtains and is constructed with a lateral slot 59 running along the center of the base of the rod. In place of the ferrules 25 employed in the first embodiment are a plurality of screws 58 disposed in the slot along the center line of each of tapes 10 and 11. In addition, an identical screw 60 is located at one end of support member 50 for collecting filaments 13–17 and communicating them to drawstring 18.

Screw 58, which may be constructed from any synthetic low-friction bearing material such as nylon, contains along its shank a helical thread 55 for receiving a self-locking fastener or nut 56, having at least one dimension wider than slot 59. Screw 58 has been modified by drilling passageway 57 through its axis. Passageway 57 has a diameter sufficient to permit the filaments to pass freely therethrough. Screws 58 and 60 thus serve as guide bushings for filaments 13–17. They may be easily assembled and positioned along slot 59 by merely inserting fastener 56 within hollow chamber 61 of support 50, and after aligning the threads with the fastener, tightening the screw down with an ordinary screw driver to the desired tension. In addition, an adhesive, such as epoxy, may be applied to threads 55 during the assembly and positioning of the screw to enhance the self-locking features of fastener 56.

Figures 5, 6A, 7, 8:
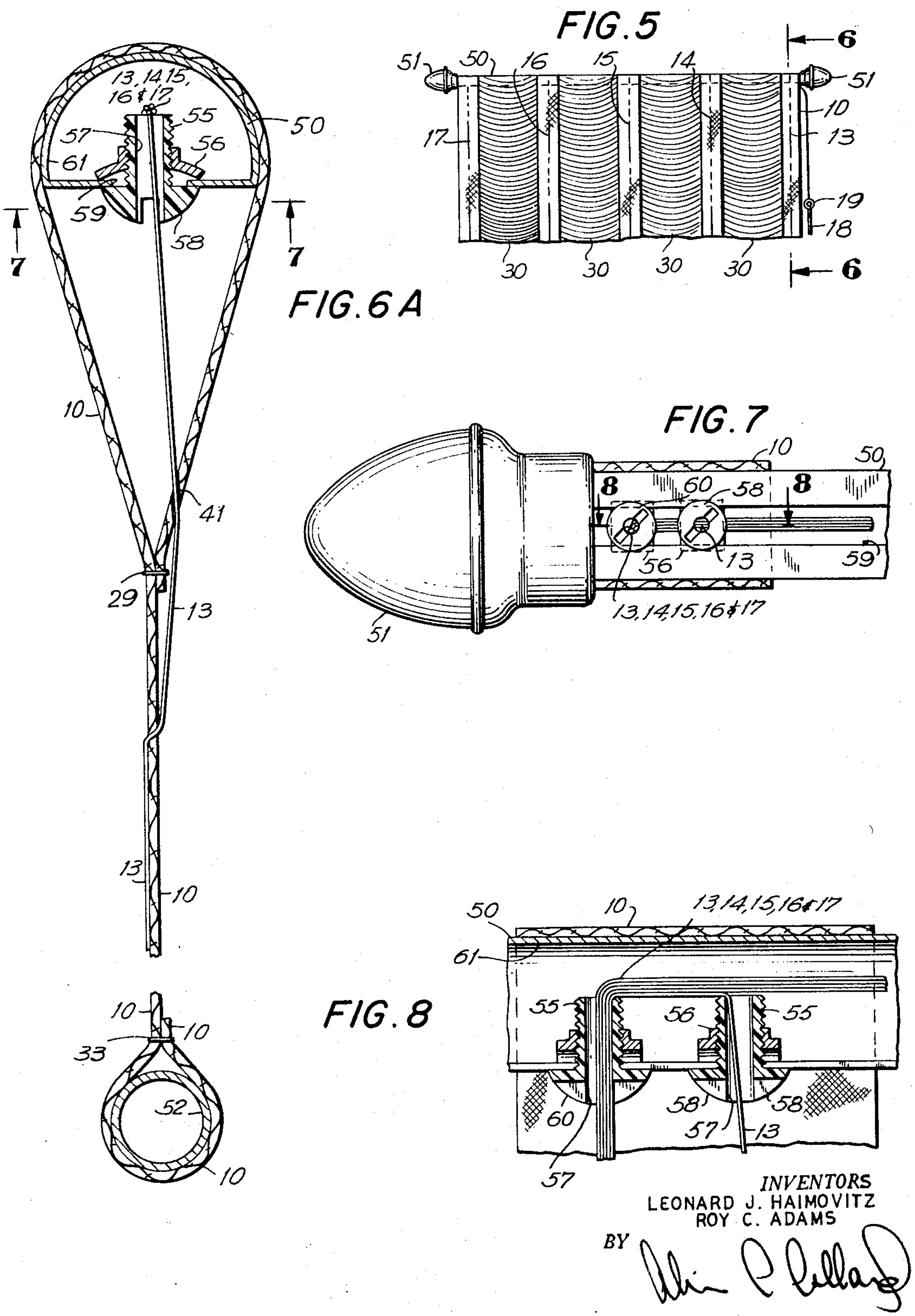
FIG. 5 is a front elevational view of a second embodiment of the curtain according to the invention.
FIGS. 6A and 6B are views of the draw-curtain mechanism taken generally along section 6—6 of FIG. 5.
FIG. 7 is a view taken along section 7—7 of FIG. 6.
FIG. 8 is a view taken along section 8—8 of FIG. 7.
Figure 6B:
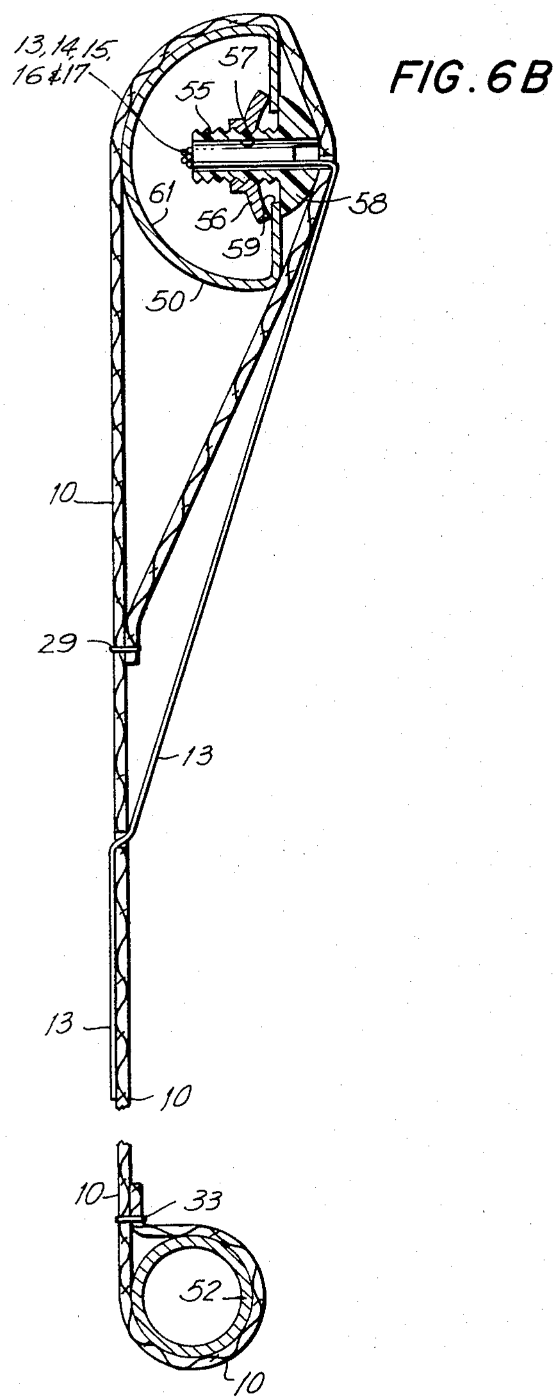

After screws 58 have been fastened in their appropriate position along slot 59 of support 50, it is obvious that all of filaments 13–17 will be collected within hollow chamber 61 of the support in a manner similar to that described with respect to the first embodiment. The draw-curtain also includes a cylindrically-shaped weighted member 52 inserted within the hem formed at the bottom of tapes 10 and 11. Member 52 does not necessarily have to be cylindrical in shape, but may be any rod or other conveniently-shaped member which provides tension to tapes 10 and 11. Member 52 also permits the draw-curtain to be counterbalanced for any height by the inclusion of a counterweight connected to the end of drawstring 18 as discussed earlier. The sectional views of FIGS. 6A and 6B illustrate that the curtain may be supported with its guide screws directed either downward or horizontally. All remaining features, including the operation of the curtain, are identical with respect to the embodiment of FIGS. 1–4.

Referring to FIGS. 9–12, there is shown a third embodiment according to the invention of a draw-curtain which employs a support member 70, having a corrugated cylindrical-shaped surface. Support 70 is constructed from a curtain rod commonly employed for sliding curtains in decorative areas. Along the flat face of support member 70 is a laterally-extending slot 78 communicative to a hollow chamber 80 within the body of support member 70. In this embodiment in place of the ferrules and synthetic screws are inserted electrical-type grommets constructed from plastic or other synthetic material having a low coefficient of sliding friction.

Figure 10B:
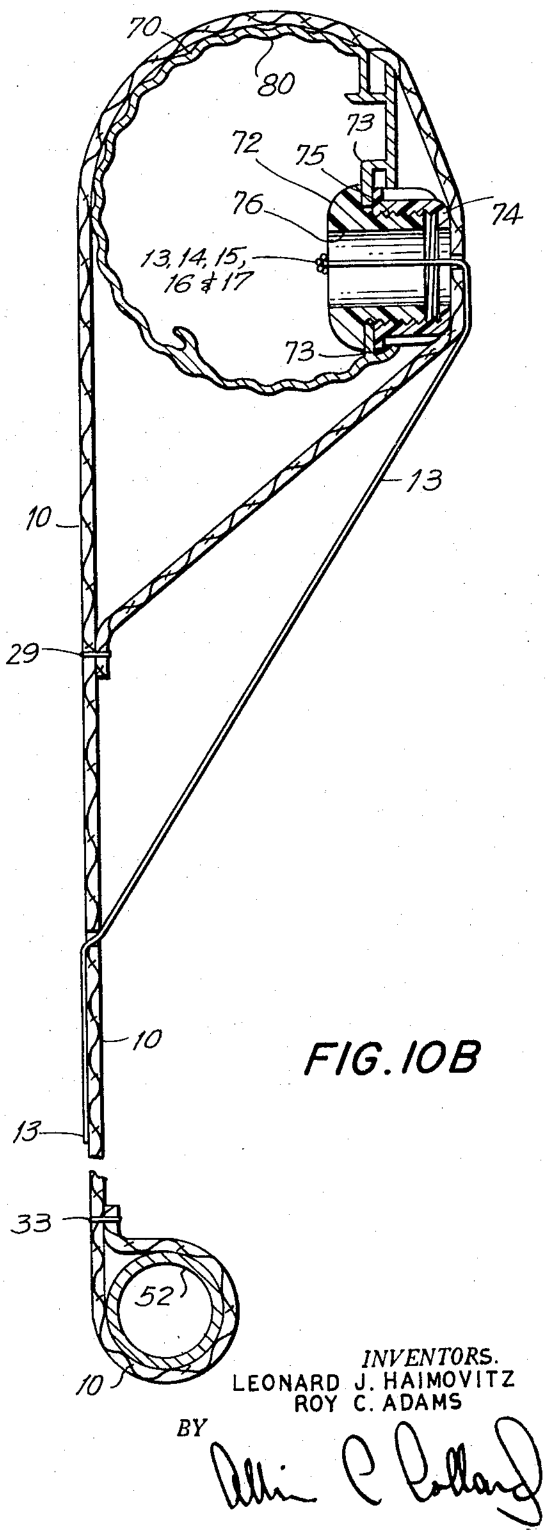
FIGS. 10A and 10B are views taken generally along section 10—10 of FIG. 9 of the curtain according to the invention.
Figure 10A:
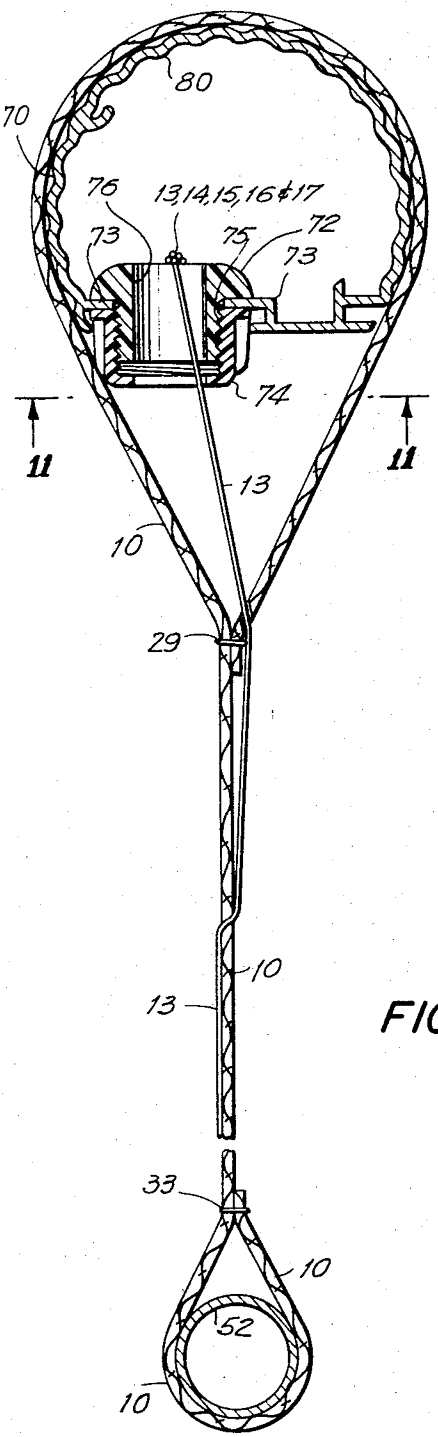
Figure 9:
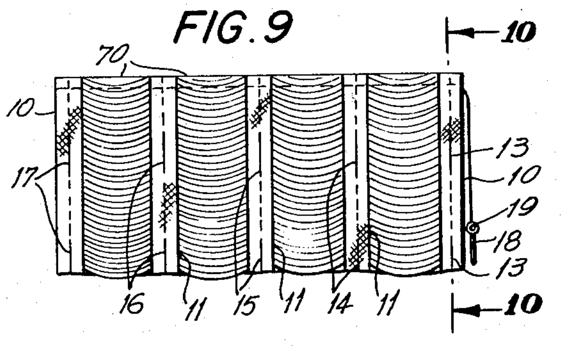
FIG. 9 is a front elevational view of a third embodiment of the curtain mechanism according to the invention.
Figure 11:
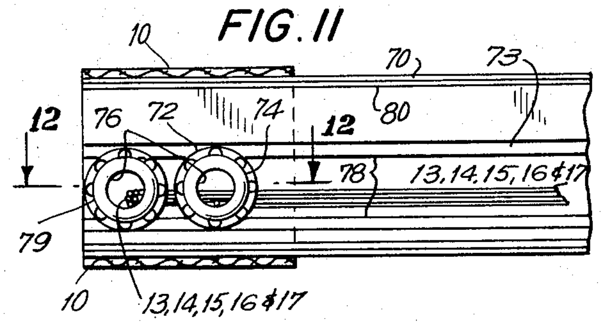
FIG. 11 is a view taken along section 11—11 of FIG. 10.
Figure 12:
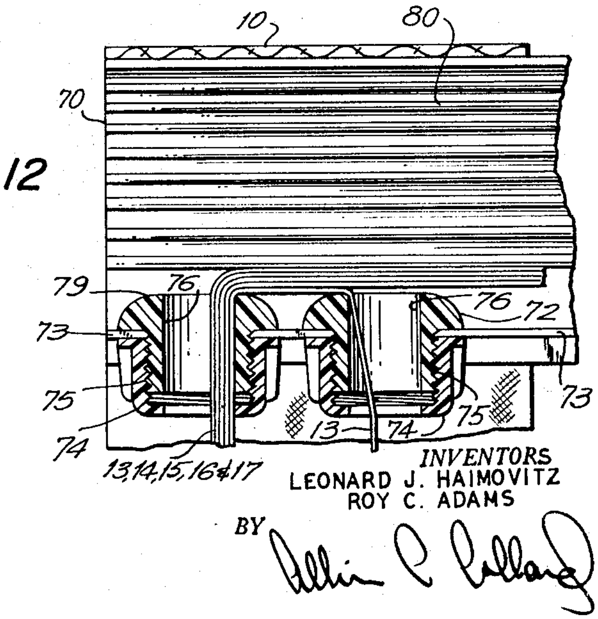
FIG. 12 is a view taken along section 12—12 of FIG. 11.

The grommet consists of a screw portion 72, having on its shank a helical thread 75. The grommet also includes a cylindrically-shaped passageway 76 concentrically formed to its axis. In the construction of this embodiment of the draw-curtain, the screw 72 of the grommet is inserted into slot 78 so that the flange adjacent to the beginning of threads 75 is in contact with oppositely-directed flanges 73, defining the opening of slot 78. A retainer or fastener 74 is then inserted over and threadably-engaged to the shank of screw 72 in order to frictionally retain the grommet to flanges 73. The grommets for each of filaments 13–17 are located in slot 78 along the center lines of tapes 10 and 11 in a manner similar to that described for the first two embodiments. Likewise, at one end of support 70, an additional grommet 79 is located for collecting filaments 13–17, and communicating them to drawstring 18 and its counterweight. As in the first two embodiments, filaments 13–17 are all collected within the hollow body portion 80 of support 70 and are thus protected against damage or breakage during the operation of the draw-curtain. Tapes 10 and 11 also include a weighted member 52 inserted into their bottom hem for pretensioning the tapes and maintaining their separation so as to inhibit the tendency of the draw-curtain from converging at its center when fully extended. The sectional views of FIGS. 10A and 10B illustrate that the curtain may be supported with its guide bushings directed either downward or horizontally. The operation of the curtain of this embodiment is identical to the operation of the first two embodiments and need not be explained further.

Figure 13:
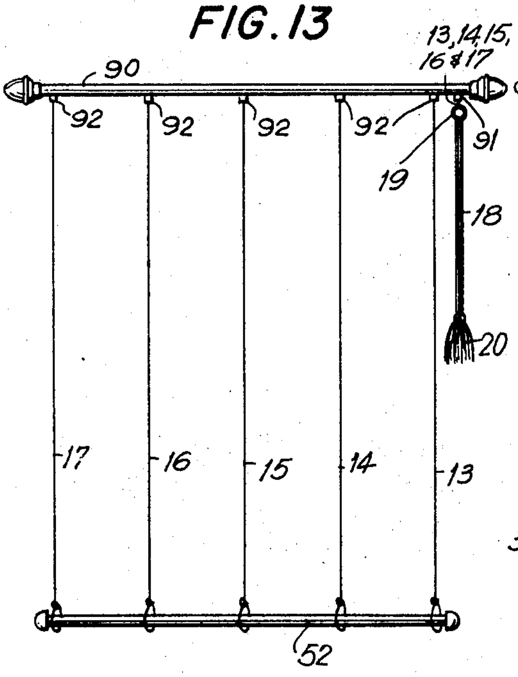
FIG. 13 is a view of the draw-curtain mechanism for use with any fabric body.
Figure 14:
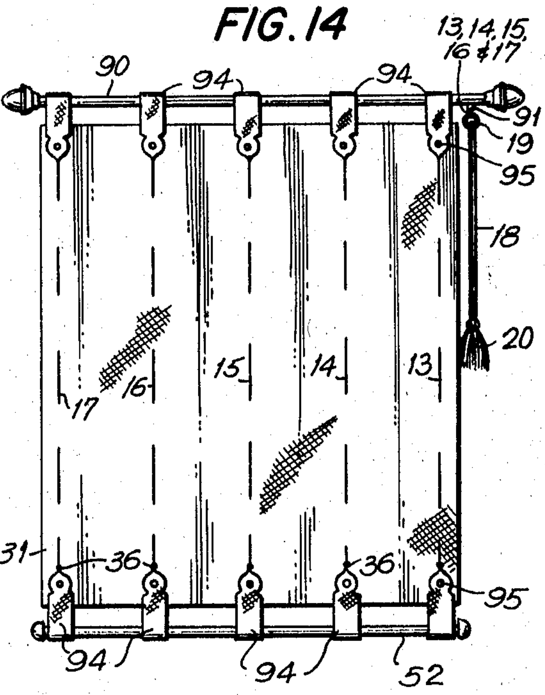
FIG. 14 is a view of the curtain mechanism of FIG. 13 after the fabric body has been installed.
Figure 15:
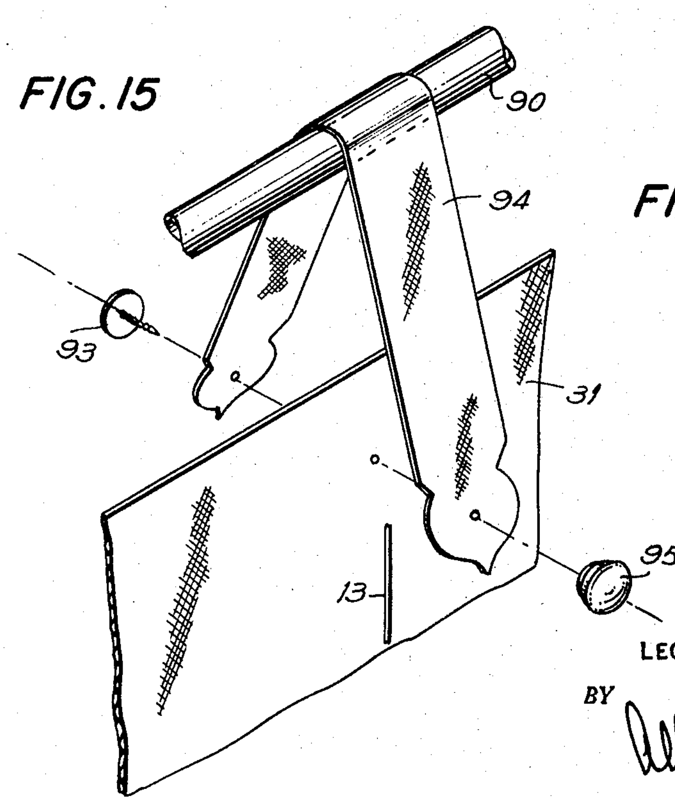
FIG. 15 is a detail view of one band utilized in joining the fabric body to the curtain mechanism.

Referring to FIGS. 13–15, there is shown a simplified version of the draw-curtain according to the invention wherein the unit is assembled initially without any fabric body so that a consumer may purchase the draw-curtain mechanism on one occasion and independently select the type and color of the fabric suitable to his individual taste for assembly on the draw-curtain mechanism with little or no difficulty on a separate occasion.

In a construction similar to that of the first three embodiments, the draw-curtain mechanism includes a hollow-support member 90 having any desirable shape, cross-section and width. Disposed equally along the same axial plane on the surface of support 90 are a plurality of bushings 92 which contain bearing surfaces that are comuniactive to the hollow chamber within support member 90, as described in detail with respect to the other embodiments. The mechanism also includes filaments 13–17 which depend from support member 90 through bushings 92 in the usual manner and are collected within support 90 by bushing 91 located at one end thereof and terminated externally on ring 19. The opposite ends of filaments 13–17 are temporarily looped around weighted member 52.

After the fabric body 31 has been chosen and tailored to the correct size, it may be easily mounted to the draw-curtain mechanism by means of a plurality of depending and suspending bands 94. Each band 94 is constructed from a decorative fabric either identical to fabric body 31 or from a contrasting fabric or pattern and terminated at each of its ends in any of a number of decorative designs.

Before the bands are assembled to join fabric body 31 to the draw-curtain mechanism, filaments 13–17 are unlooped from weighted member 52, individually threaded to a needle (not shown) and interlaced alternately along the length of fabric body 31 in a manner identical to that of the other embodiments. At the last passage through the fabric near the bottom hem, the filaments are then knotted to form a loop and the excess length is trimmed away.

Suspending bands 94 are then looped around weighted member 52 and are then individually pinned at the termination of filaments 13–17 and preferably in a manner so that pin 93 passes not only through a portion of the bottom of the fabric but also through the loop formed by the knot at the end of each of the filaments before fastener 95 is inserted thereover. Depending bands 94 may also be mounted in a similar manner by bending them around supporting member 90 and through a portion adjacent to the top of the fabric and preferably adjacent to filaments 13–17. Pins 93 are set within the fabric of depending bands 94 so as not to interfere with the freedom of movement of filaments 13–17 when fabric body 31 is raised and lowered. It is obvious that in place of individual bands 94, a single band of material representing one continuous band may be wrapped around and pinned to the top of the fabric. Likewise, a second continuous band of material may be pinned to the bottom of the fabric for supporting weighted member 52. Moreover, fabric body 31 need not be confined to any particular design or shape, but may be selected from a contiguous body of textile, or may be of "Austrian" design, as illustrated with respect to the first three embodiments.

Figure 16:
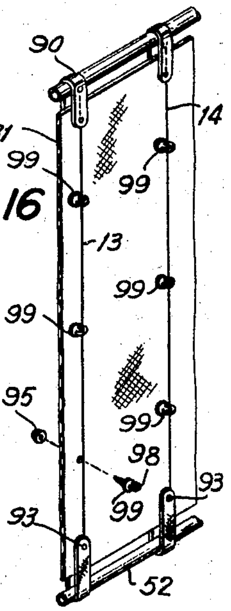
FIG. 16 is a detail view of another means of controlling the height of the fabric body.

Referring to FIG. 16 there is shown another embodiment of the draw-curtain mechanism according to the invention wherein the control lines 13–17 are not alternately interleaved through fabric body 31, but are maintained through guides on the back side of the fabric. The guides consist of a tack 99 having an eyelet 98 secured to its outer surface for containing each of the control lines passed therethrough. Tacks 99 are secured to the back of the fabric every six or eight inches along the line of travel of each of the control lines by means of self-locking fastener 95. The ends of the control lines are secured to the fabric body adjacent to rod 52 in any well known manner.

The advantage of utilizing tacks 99 over interleaving the control lines through the fabric is that fabric body 31 may be quickly disconnected from the draw-curtain mechanism for the purposes of cleaning or for substituting a new fabric body during the change of seasons.

When the curtain is raised by the downward pull of the drawstring, fabric body 31 then folds from the bottom in a series of horizontal pleats originating along the lines defining the horizontal placement of tacks 99.

As further interest in the operation of the draw-curtain mechanism according to the invention for all embodiments disclosed, it has been found that the counterweighted drawstring need not be accessible in order to adjust the height of the curtain. Since there is uninhibited freedom of movement of all of the filaments which control the height of the curtain, it is possible to adjust its height with "finger-tip" control by merely raising or lowering support member 52 or 32 to the desired height. This means that the drawstring need never be accessible to the user of the curtain, nor is it important on which side the drawstring is placed when the curtain is permanently mounted.

What is claimed is:

1. An adjustable draw-curtain apparatus comprising;

a unitary horizontal support member having an enclosed hollow chamber extending throughout its length, a plurality of spaced apart bushings secured along the length of said support member said bushings each having an aperture communicative with the hollow chamber of said support member, and end bushing secured adjacent to one end of said support member and having an aperture communicative with the hollow chamber of said support member, a plurality of lines slidably contained within said hollow chamber and having one end of each dispensed through each of said bushing apertures and having their opposite ends collected through said end bushaperture, a rod member for receiving the free ends of said dispensed lines, and a counterweight coupled to the opposite ends of lines to counterbalance the weight of said rod member and a portion of the curtain to be mounted so that the curtain will remain in a stable position after adjustment to a predetermined height.

2. The apparatus as recited in claim 1 additionally comprising a curtain having a substantially rectangular body coupled at one end to said support member, and at its opposite end, to said rod member.

3. The apparatus as recited in claim 2 wherein said dispensed lines are alternately interleaved at spaced apart intervals along the length of said curtain.

4. The apparatus as recited in claim 2 wherein said curtain additionally comprises eyelets secured thereon at spaced intervals along paths below each of said bushings for receiving said dispensed lines.

5. The apparatus as recited in claim 2 additionally comprising a plurality of bands spaced apart at intervals along the length of said support member, and fastening means for securing one end of said curtain to each of said bands for support on said support member.

References Cited

UNITED STATES PATENTS

| | | | |
|---|---|---|---|
| 1,289,281 | 12/1918 | Shaft | 160—84 |
| 1,321,800 | 11/1919 | Andress et al. | 160—84 |
| 1,326,249 | 12/1919 | Batty | 160—84 |
| 1,407,248 | 2/1922 | Brown | 160—84 |
| 1,663,819 | 3/1928 | Shaft | 160—84 |
| 2,247,260 | 6/1941 | Stone | 160—84 |
| 2,386,695 | 10/1945 | Lister-Torsen | 160—172 |
| 3,160,202 | 12/1964 | Rosen | 160—84 X |
| 3,322,182 | 5/1967 | Palella | 160—344 |
| 2,410,662 | 11/1946 | Kahn | 160—388 X |

PETER M. CAUN, *Primary Examiner.*

U.S. Cl. X.R.

160—345, 388